April 15, 1952     W. C. DILLON     2,592,795
WEIGHING SCALE
Filed June 11, 1949     4 Sheets-Sheet 1
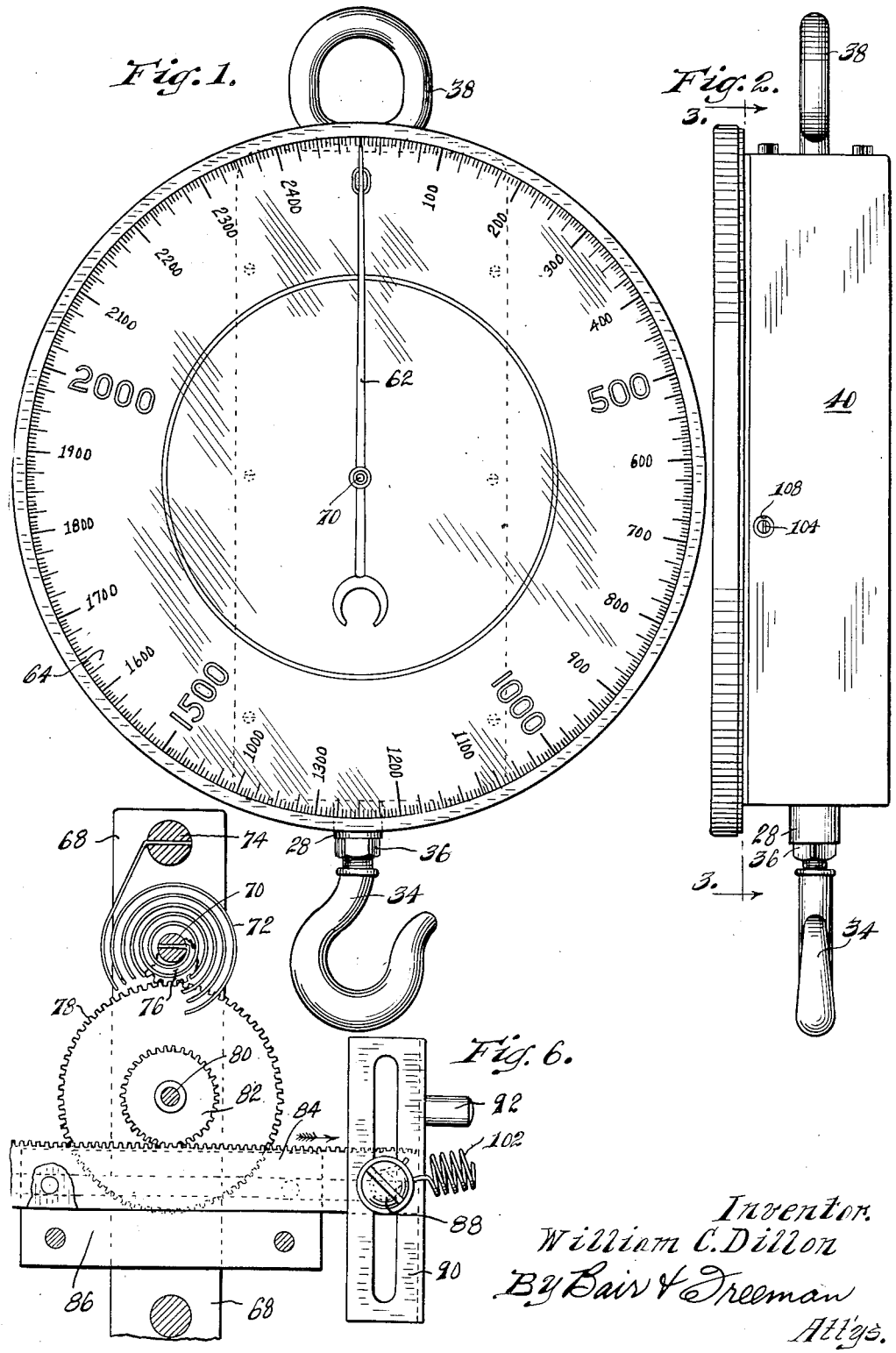

April 15, 1952 — W. C. DILLON — 2,592,795
WEIGHING SCALE
Filed June 11, 1949 — 4 Sheets-Sheet 2
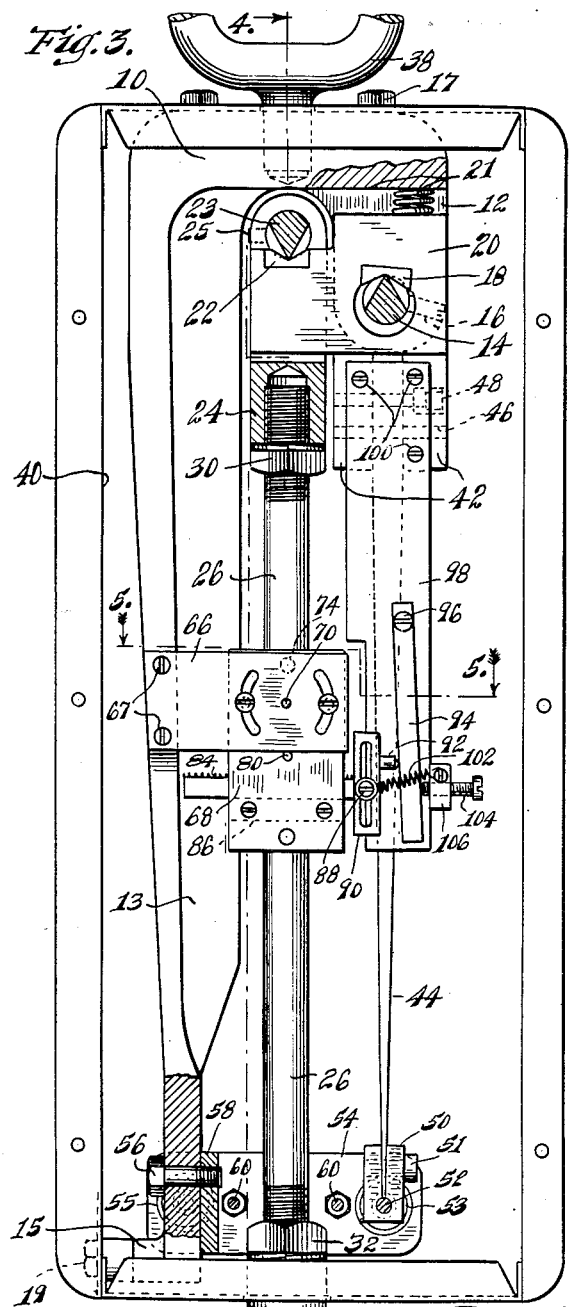
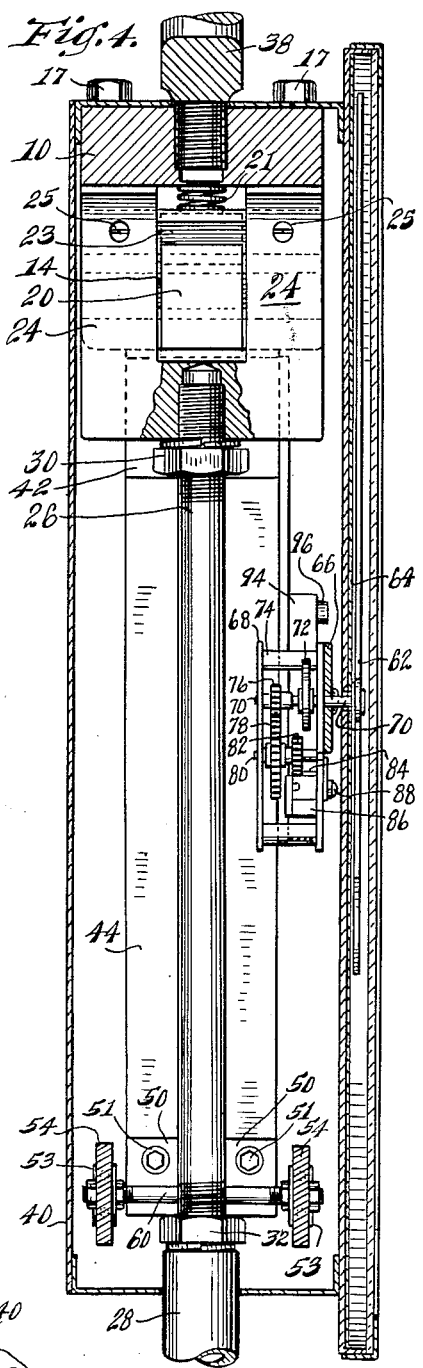
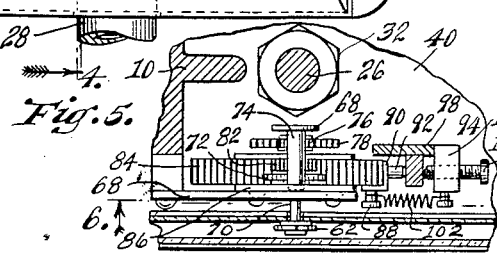
Inventor:
William C. Dillon
By Bair & Freeman
Att'ys.

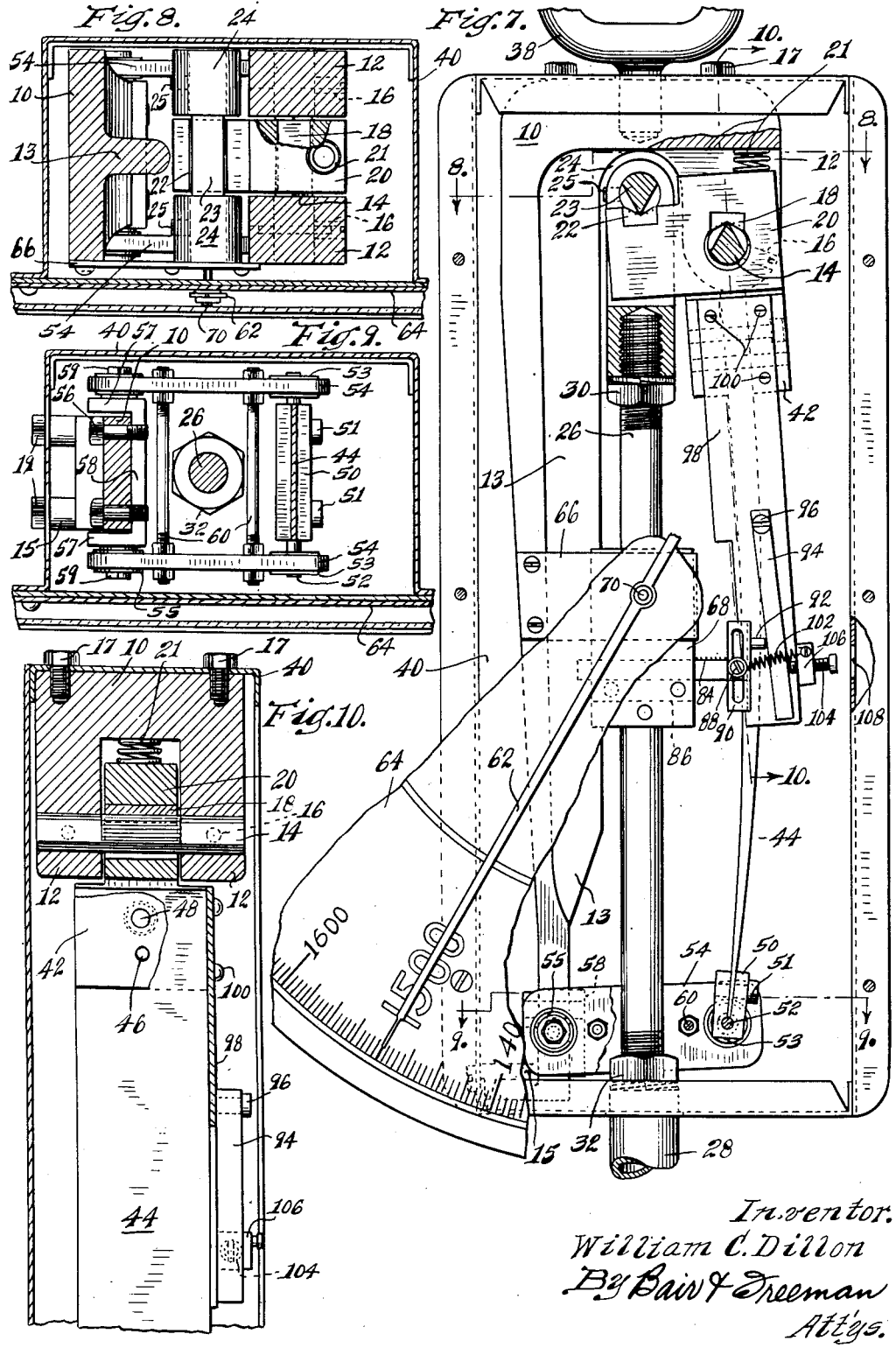

April 15, 1952 W. C. DILLON 2,592,795
WEIGHING SCALE
Filed June 11, 1949 4 Sheets-Sheet 4
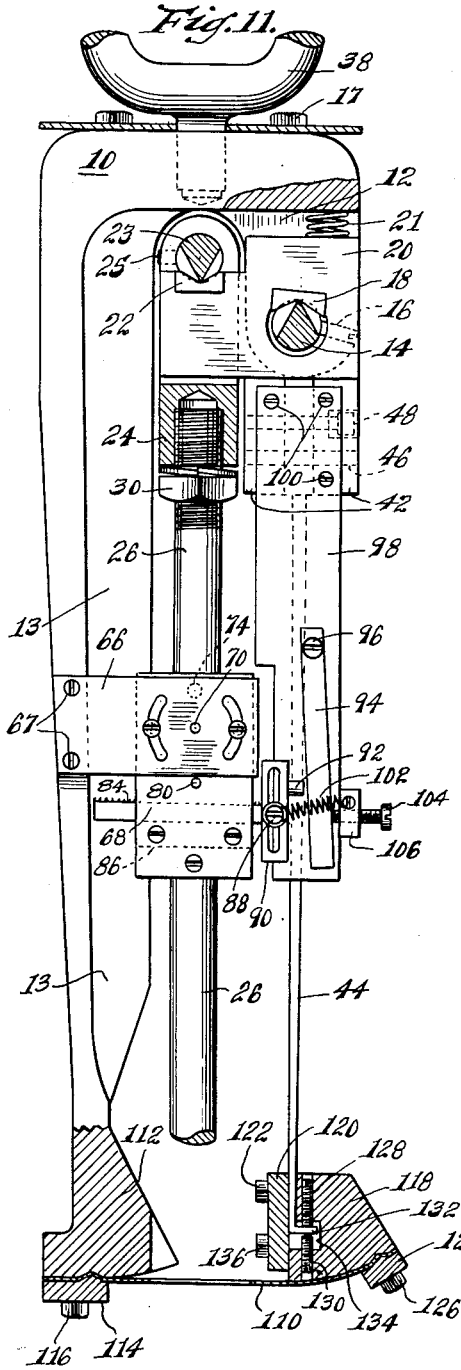
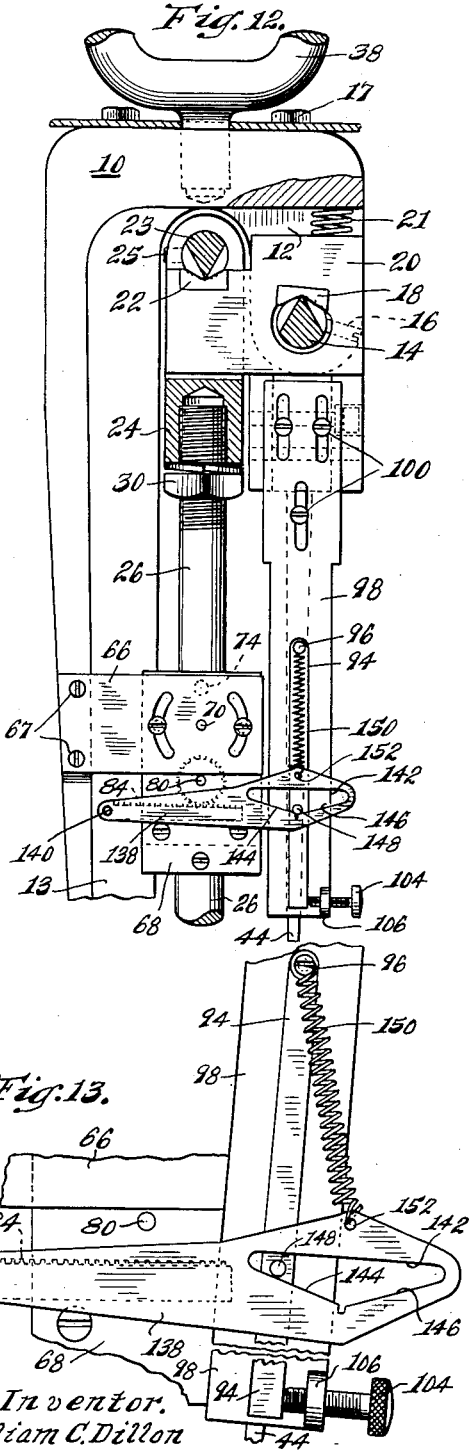
Inventor.
William C. Dillon
By Bair & Freeman
Att'ys.

Patented Apr. 15, 1952

2,592,795

UNITED STATES PATENT OFFICE 2,592,795

WEIGHING SCALE

William C. Dillon, West Chicago, Ill., assignor to W. C. Dillon & Company, Inc., Chicago, Ill., a corporation of Illinois Application June 11, 1949, Serial No. 98,489

18 Claims. (Cl. 265—68)

This invention relates to a weighing scale and more particularly to one for industrial use that can be easily suspended, having capacities equal to industrial handling equipment and a dial with graduations sufficiently large to be read at material handling working distances.

One object of the invention is to provide a scale having relatively great capacity, that is, up to twenty five tons or greater, the weighing mechanism within the scale being relatively small and compact yet capable of withstanding loads of the order mentioned without undue stress and with maximum accuracy of indication.

Another object of the invention is to provide a suspension weighing scale which is simple, rugged, lightweight and compact, has a high degree of precision that can be built in a wide range of capacities ranging from a fraction of a pound full scale to many tons full scale, and suitable for use by farmers, truckers, industrial plants, etc.; to provide a scale having suspension eyes stably mounted in line with the center of gravity and a mechanism involving a few simple parts so disposed to be closely adjacent to the vertical axis of the scale, along which axis the scale is supported and the load is applied; to provide a scale requiring a very small movement of the steel yard to produce a 360 degree rotation of the indicating pointer; to provide a scale having a fulcrum ratio mechanism coupled to a deflecting beam, which deflection is a measure of the applied load; to provide a scale having a 360 degree direct reading face dial and a pointer actuated by the movement of a lever mounted on the fulcrum of a deflecting beam; to provide a scale in which the indicating pointer and mechanism cannot be damaged by heavy impact loads applied to the scale; to provide a scale in which every increment of the load is in straight line proportion to the circumferential movement of the indicating pointer about the dial; and to provide a scale having, in addition to a zero adjustment, a dial graduation load ratio adjustment (easily accessible and sealable) to provide straight line compensation of the indicating pointer 360 degrees around the uniformly graduated dial, thereby eliminating the need for extreme precision of the various parts of the scale which may vary in composition or other characteristics.

Still another object is to provide an industrial scale provided with a self resetting impact safety feature and having scale mechanism consisting of a main lever support which has a supporting eye projecting from its upper end for suspending the scale and at its lower end carries a pivoted link with which the lower end of a deflection beam is connected, the upper end of the beam being mounted in a fulcrum block which is fulcrumed at one end of the main lever support and has fulcrumed thereon a shackle in line with the supporting eye and a lifting hook connected with the shackle in line with the eye and extending from the lower end of the scale housing, the parts enumerated in this object being all that are necessary for supporting a load and effecting a predetermined deflection of the deflection beam in accordance therewith.

Still another object is to provide a housing for the mechanism of the last object and a dial and actuating mechanism therefor cooperable with the deflection beam, which parts complete the scale so that it is composed of relatively few parts and is therefore inexpensive to manufacture.

A further object is to provide a minimum of parts necessary to effect deflection of the deflection beam so that the scale is relatively foolproof in operation and can be easily serviced when the need arises.

A still further object is to provide a novel calibrating means for adjusting the gauge movement of the scale to accurately indicate the weight on the dial in response to the particular deflection beam used in a particular scale, which beams or other parts of the scale need not be held to close specifications but may vary in composition or other characteristics, all of which can be compensated for by the calibrating mechanism so that the scale is accurate throughout its range.

An additional object is to provide in connection with the calibrating mechanism a zero adjusting screw that cooperates therewith to adjust the needle in relation to the zero of the dial, which adjustment may be effected by the user after the calibrating mechanism has been adjusted at the factory.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a front elevation of a weighing scale embodying my present invention;

Figure 2 is a side elevation thereof;

Figure 3 is an enlarged vertical sectional view on the line 3—3 of Figure 2;

Figure 4 is a vertical sectional view on the line 4—4 of Figure 3;

Figure 5 is a detailed horizontal sectional view through the gauge movement taken on the line 5—5 of Figure 3;

Figure 6 is an enlarged sectional view on the line 6—6 of Figure 5;

Figure 7 is a view similar to Figure 3 showing the parts under load together with a small section of the indicating dial and the indicating needle to show its position when a certain load is imposed on the scale;

Figure 8 is a horizontal sectional view on the line 8—8 of Figure 7;

Figure 9 is a horizontal sectional view on the line 9—9 of Fifure 7;

Figure 10 is a vertical sectional view on the line 10—10 of Figure 7.

Figure 11 is a sectional view similar to Figure 3 showing a modified construction with respect to connecting means between a main lever support and a deflection bar at the lower end of the scale;

Figure 12 is a similar sectional view showing a modification with respect to the connection between a movable part of the scale responding to weight imposed thereon and the gauge movement, this connection being a self resetting impact safety feature; and Figure 13 is an enlarged view of a portion of Figure 12 showing the parts in the position they assume when a load is suddenly applied to the scale.

On the accompanying drawings I have used the reference numeral 10 to indicate a main lever support which may be formed of cast steel or malleable iron. The support 10 is in the form of an L-shaped arm having a long vertical arm and a short horizontal arm. It is preferably T-shaped in cross section as illustrated in Figure 8, having a flange 13.

Depending from the horizontal arm is a pair of fulcrum supporting extensions 12 adapted to support a knife edge 14. The knife edge is in the form of a suitable shaped rod having its ends in the fulcrum supporting extensions 12 and secured in position by set screws 16. A knife edged bearing 18 is adapted to rock thereon and is positioned in a fulcrum block 20. The fulcrum block 20 is of the shape shown in Figure 3 and carries a second knife edged bearing 22 on which a knife edge 23 rests. The ends of the knife edge 23 are supported in a yoke 24 and secured in the arms thereof by set screws 25.

The cross piece of the yoke 24 is threaded to receive the upper end of a rod 26, the lower end of which is received in a coupling 28 with lock nuts 30 and 32 to retain the parts against rotation relative to each other after they are adjusted. In the lower end of the coupling 28 a lifting hook 34 is screwed and retained in position by a lock nut 36.

The mechanism thus far described is supported by a lifting eye 38 screwed into the short horizontal arm at the top of main lever support 10. The mechanism is housed within a casing 40 to keep out dirt and other foreign matter. Screws 17 at the top and 19 at the lower left corner in Figure 3 secure the casing in position.

The fulcrum block 20 is narrow enough to fit between the fulcrum supporting extensions 12 and the arms of the yoke 24 as shown in Figures 4 and 10 and as further shown in Figure 10 its lower part 42 is widened and the widened part is bifurcated as shown dotted in Figure 3 to receive the upper end of a deflection bar 44. A dowel pin 46 and a screw 48 hold the deflection bar in position so that the bar depends alongside the rod 26.

The lower end of the deflection bar 44 is clamped in a split block 50 mounted on a shaft 52. Clamp screws 51 are provided extending through the deflection bar to retain the parts assembled. The shaft 52 is journalled by means of ball bearings 53 in arms 54 which are held assembled to each other by tie rods 60. The arms 54 are pivoted by ball bearings 55 to studs 59 extending from the arms 57 of a U-shaped bracket. The attaching base for this bracket is indicated at 58 and it is secured to the vertical arm of the main lever support 10 by screws 56.

The foregoing mechanism operates in the following manner when a load is applied:

Referring to Figure 7 the load has lowered the lifting hook 34 so that the fulcrum block 20 is tilted from the normal position of Figure 3 to an inclined position. This likewise inclines the upper end of the deflection bar as illustrated and as permitted by the deflection of the bar to the curved shape illustrated in Figure 7. Obviously, the heavier the load the greater will be the deflection, this figure showing a deflection to 1500 lbs. on a 2500 lb. scale merely by way of example. The scale disclosed however can be used for capacities of 500, 1000 or 5000 lbs. by changing deflection bars to use a lighter or heavier one to suit the requirements.

The deflection of the deflection bar 44 is taken advantage of for the purpose of operating an indicating needle 62 in relation to a dial 64. A gauge movement is provided for this purpose comprising a bracket 66 secured to the main lever support 10 by screws 67 and supporting in turn a gauge movement frame 68. The mechanism of the movement is shown in Figures 5 and 6 and comprises a shaft 70 for the needle 62 which shaft is biased away from the zero position by a hair spring 72. One end of the hair spring is anchored in the shaft 70 is the usual manner and the other end is anchored in a stationary stud 74 mounted in the gauge movement frame 68. A pinion 76 (partially broken away in Figure 6) is mounted on the shaft 70 and meshes with a gear 78. The gear 78 rotates on a shaft 80 carried by the frame 68 and has secured thereto a pinion 82. A rack 84 slides along a guide 86 of the frame 68 and meshes with the pinion 82.

Secured by a screw 88 to one end of the rack 84 is a slotted cross head 90 carrying a contact pin 92. This pin is adapted to contact with a zero-adjust lever 94 pivoted at 96 to a plate 98 which plate is secured to the extension 42 of the fulcrum block 20 by screws 100. The plate accordingly swings coincident with the fulcrum block thereby causing movement of the zero-adjust lever 94 and corresponding movement of the rack 84 and the indicating needle 62. To aid the hair spring 72 in keeping the follower pin 92 against the zero-adjust lever, a spring 102 is provided and the lever is also thus retained against a zero-adjust screw 104 carried by a bracket 106 of the plate 98. The hair spring also serves to keep all play out of the gauge movement. The casing 40 is provided with an opening 108 through which a screw driver may be thrust for adjusting the screw 104 as shown in Figure 7.

In Figure 11 I show a modification wherein a flexible strap 110 connects the lower end of the main lever support 10 with the lower end of the deflection bar 44. The strap 110 may be made of spring steel or the like and is secured to an enlargement 112 on the lower end of the support 10 by a clamp bar 114 and clamp screws 116. It is also secured to a head 118 by means of a clamp bar 124 and clamp screws 126. The head 118 is secured to the lower end of the deflection bar 44 by means of a clamp bar 120 and clamp screws 122.

The holes in the bar 44 for the screws 122 are slotted so that the head 118 can be vertically adjusted to properly align the portion of the head against which the strap 110 engages with the lower surface of the enlargement 112. Adjustment for this purpose is accomplished by a pair of set screws 128 and 130 bearing against opposite sides of a foot 132 bent on the lower end of the bar 44. The head 118 is provided with a notch 134 to receive the foot and additional clamp screws 136 are provided for the clamp bar 120 after the adjustment is made by the screws 128 and 130. The strap 110 as well as the links 54 serve as flexible connections between the lower end of the main lever support and the deflection bar.

When a load is suddenly applied to the scale, the parts connecting the deflection bar with the gauge movement are placed under considerable strain. In Figures 12 and 13 I provide a self-resetting impact safety feature to relieve such strain in the form of a connection between the plate 98 and the rack 84. This connection comprises a link 138 pivoted at 140 to the rack and provided with a slot 142 having inclined lower edges 144 and 146. These edges are retained against a pin 148 extending from the zero-adjust lever 94 by a spring 150 connected at 152 to the link 138 and to the pin 96.

Normally, due to the inclination of 144 and 146 the pin 148 is a predetermined distance from the pivot 140 (at the bottom of the V-shaped notch formed by the edges 144 and 146). When a load is suddenly applied to the scale, the parts from the hook 34 to the pin 148 are capable of withstanding the shock but the gauge movement is more delicate in construction and sudden loads are injurious to it. Accordingly, as illustrated in Figure 13, a sudden load will merely move the pin 148 up the incline 146 because inertia of the gauge movement is greater than the force of the spring 150 tending to keep the pin 148 at the bottom of the V-notch 144—146. The inclination of the edges of the notch however are sufficient to thereafter permit the spring 150 to cause the link 138 to move toward the left as a result of the bottom of the notch contacting the pin 148. The gauge movement will be thereby operated and the pointer will stop its sweep across the dial when the bottom of the V notch reaches the pin 148. This is the resetting feature of the impact safety mechanism disclosed in Figures 12 and 13.

*Practical operation*

From the foregoing description of my weighing scale, its operation is believed obvious. As deflection of the deflection bar 44 occurs, the plate 98 swings as illustrated in Figure 7 and the spring 102 causes the follower pin 92 to follow the zero-adjust lever 94. This causes movement of the rack 84 in a right hand direction for rotating the pinion 82 and the gear 78 counter-clockwise and the pinion 76 clockwise for likewise rotating the indicating needle 62 clockwise. The hair spring 72 is wound up during this operation and serves at all times to take up play between the teeth of the rack, pinions and gear so that the movements of the needle 62 are accurate in relation to deflection of the bar 44 as caused by the load imposed on the lifting hook 34.

After the parts are assembled adjustment at the factory is possible by changing the leverage between the deflection bracket 98 and the rack 84. This is accomplished by loosening the screw 88 and raising or lowering the cross head 90 so that its follower pin 92 may contact the zero-adjust lever 94 closer to or farther away from the fulcrum 14—18. The deflection bar 44 may also be replaced by a lighter or heavier one as already pointed out. Thus the scale can be adjusted for causing a predetermined load applied to the scale to move the indicating needle to the proper indicia on the dial 64 corresponding to that load.

Subsequently, when the scale is in use the operator may adjust the needle 62 to the zero position by means of the screw 104 and may use this adjustment for the purpose of compensating for a chain or other lifting device carried by the lifting hook 34.

The parts necessary for effecting deflection in response to a load are relatively few and simple so that manufacturing cost and maintenance of the scale are reduced to a minimum. Simple adjustments are provided for calibrating the scale after it is manufactured and to take care of any normal manufacturing discrepancies, and adjustments for changing the capacity of the scale within considerable limits is provided. When once the scale is in service it can be readily zero-adjusted and due to its rugged character will withstand comparatively large loads without overstressing the parts of which the scale is composed.

The flexible connection shown at 110 in Figure 11 may be used instead of the links 54 in Figure 3 and some what simplify the construction in addition to eliminating the necessity for the ball bearings 53 and 55. When the scale is constructed in accordance with this arrangement, it can be manufactured at less cost.

The self-resetting impact feature disclosed in Figures 12 and 13 is desirable in connection with the scale herein disclosed in order to prevent the impact produced by loads suddenly applied to the scale from damaging the gauge mechanism due to its inertia. The mechanism automatically resets itself due to the combined action of the spring 150 and the V groove 144—146 in relation to the pin 148; yet always insures accuracy of the indicating needle position in relation to the position assumed by the deflection bar 44 as a result of weight applied to the scale.

Some changes may be made in the construction and arrangement of the parts of my device without departing from the real spirit and purpose of my invention, and it is my intention to cover by my claims any modified forms of structure or use of mechanical equivalents which may be reasonbly included within their scope.

I claim as my invention:

1. In a weighing scale, a main lever support comprising a vertical arm, a horizontal arm and an extension depending from said horizontal arm, means for supporting said main lever support, said means being connected with said horizontal arm intermediate its ends, said extension carrying a knife edge, a fulcrum block pivoted thereon, a second knife edge pivoted on said fulcrum block in line with said means of support, a yoke carrying said last knife edge, a lifting hook depending from said yoke, a deflection bar secured to said fulcrum block and depending therefrom alongside said hook, a link pivoted at its ends to said main lever support adjacent the lower end of said vertical arm and to the lower end of said deflection bar, and means for sensing the deflection of said deflection bar when a weight is imposed on said lifting hook.

2. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a link pivoted at its ends to said main lever support adjacent the lower end of said vertical arm and to the lower end of said deflection bar, and means for sensing the deflection of said deflection bar when a weight is imposed on said lifting hook.

3. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook.

4. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook, said means comprising an arm connected with said fulcrum block, a zero-adjust lever pivoted thereto, a zero-adjust screw carried by said arm and engaging said zero-adjust lever to adjust the same, and a gauge movement on said main lever support and including a contact pin for engagement with said zero-adjust lever.

5. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook, said means comprising an arm connected with said fulcrum block, and a gauge movement on said main lever support and including a contact pin for engagement with an abutment on said arm.

6. A weighing scale of the character disclosed comprising a U-shaped support mounted in an inverted position with one arm of the U considerably longer that the other, a yoke between said arms, the arms and said yoke carrying oppositely disposed knife edges, a fulcrum block having knife edge bearings to coact with said knife edges, a supporting eye for said U-shaped support in alinement with said yoke, a supporting hook depending from said yoke, a deflection bar depending from the said fulcrum block, a link connection between the lower end of said deflection bar and said support, and means depending from said fulcrum block for sensing the deflection of said deflection bar.

7. A weighing scale of the character disclosed comprising a U-shaped support mounted in an inverted position with one arm of the U considerably longer than the other, a yoke between said arms, the arms and said yoke carrying oppositely disposed knife edges, a fulcrum block having knife edge bearings to coact with said knife edges, a spring between said support and said fulcrum block to retain both of said knife edges seated in said knife edge bearings, a support for said U-shaped support in alinement with said yoke, a supporting hook depending from said yoke, a deflection bar depending from the said fulcrum block, a pivoted link connection between said support and bar, and means for sensing the deflection of said deflection bar.

8. A weighing scale of the character disclosed comprising a U-shaped support mounted in an inverted position with one arm of the U considerably longer than the other, a yoke between said arms, a fulcrum block pivoted to the short arm and said yoke, a support for said U-shaped support in alinement with said yoke, a supporting hook depending from said yoke, a deflection bar depending from the said fulcrum block and link-pivoted at its lower end to the long arm of said support, and means intermediate said fulcrum block and said link-pivoted end of said deflection for sensing the deflection thereof.

9. A weighing scale of the character disclosed comprising a U-shaped support mounted in an inverted position with one arm of the U considerably longer than the other, a yoke between said arms, a fulcrum block pivoted to the short arm and said yoke, a support for said U-shaped support in alinement with said yoke, a supporting hook depending from said yoke, a deflection bar depending from the said fulcrum block and link-pivoted at its lower end to the long arm of said support, and means intermediate said fulcrum block and said link-pivoted end of said deflection for sensing the deflection thereof, said means comprising an arm connected with said fulcrum block, a zero-adjust lever pivoted thereto, a zero-adjust screw carried by said arm and engaging said zero-adjust lever to adjust the same, and a gauge movement supported on said U-shaped support and including a contact pin for engagement with said zero-adjusting lever.

10. A weighing scale of the character disclosed comprising a U-shaped support mounted in an inverted position with one arm of the U considerably longer than the other, a yoke between said arms, a fulcrum block pivoted to the short arm and said yoke, a support for said U-shaped support in alinement with said yoke, a supporting hook depending from said yoke, a deflection bar depending from the said fulcrum block and link-pivoted at its lower end to the long arm of said support, and means intermediate said fulcrum block and said link-pivoted end of deflection for sensing the deflection thereof, said means comprising an arm connected with said fulcrum block, and a gauge movement on said U-shaped support and including a contact pin for engagement with said arm.

11. A weighing scale of the character disclosed comprising a U-shaped support mounted in an inverted position with one arm of the U considerably longer than the other, a yoke between said arms, a fulcrum block pivoted to the short arm and said yoke, a support for said U-shaped support in alinement with said yoke, a supporting hook depending from said yoke, a deflection bar depending from the said fulcrum block and link-pivoted at its lower end to the long arm of said support, and means intermediate said fulcrum block and said link-pivoted end of said deflection for sensing the deflection thereof, said means comprising an arm connected with said fulcrum block, and a gauge movement on said U-shaped support and including a contact pin for engagement with said arm.

12. A weighing scale of the character disclosed comprising a U-shaped support mounted in an inverted position with one arm of the U considerably longer than the other, a yoke between said arms, a fulcrum block pivoted to the short arm and said yoke, a support for said U-shaped support in alinement with said yoke, a supporting hook depending from said yoke, a deflection bar depending from the said fulcrum block and link-pivoted at its lower end to the long arm of said support, and means intermediate said fulcrum block and said link-pivoted end of said deflection for sensing the deflection thereof, said means comprising an arm connected with said fulcrum block, a zero-adjust lever pivoted thereto, a zero-adjust screw carried by said arm and engaging said zero-adjust lever to adjust the same, and a gauge movement supported on said U-shaped support and including a contact pin for engagement with said zero-adjusting lever.

13. In a weighing scale, a main lever support comprising a vertical arm, a horizontal arm and an extension depending from said horizontal arm, means for supporting said main lever support, said means being connected with said horizontal arm intermediate its ends, said extension carrying a knife edge, a fulcrum block pivoted thereon, a spring interposed between said extension and said fulcrum block beyond said knife edge to retain said fulcrum block against the knife edge, a second knife edge pivoted on said fulcrum block in line with said means of support, a yoke carrying said last knife edge, a lifting rod depending from said yoke, a deflection bar secured to said fulcrum block and depending therefrom alongside said lifting rod, a link pivoted at its ends to said main lever support and said deflection bar, and means for sensing the deflection of said deflection bar.

14. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook, said means comprising an arm connected with said fulcrum block, a pin carried thereby, a gauge movement on said main lever support, and means to operatively connect said arm with said gauge movement comprising a link pivoted to said gauge movement and having a relatively shallow V notch cooperating with said pin, and spring means tending to swing said link for centering said pin in relation to said V notch.

15. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook, said means comprising a gauge movement on said main lever support and including a movable element, and means to operatively connect said fulcrum block with said movable element comprising a link pivoted to said movable element and having a relatively shallow V notch, means biasing said notch in the direction of its wide end, and a pin carried by said fulcrum block and engaged by said notch.

16. In a weighing scale, a main lever support comprising a vertical arm, a horizontal arm and an extension depending from said horizontal arm, means connected with said horizontal arm for supporting said main lever support, a fulcrum block pivoted to said extension, a yoke pivoted to said fulcrum block in line with said means of support, a lifting hook depending from said yoke, a deflection bar secured to said fulcrum block and depending therefrom alongside said hook, a flexible connection between said main lever support and said deflection bar, and means for sensing the deflection of said deflection bar in response to a weight imposed on said lifting hook, said means comprising an arm connected with said fulcrum block, a zero-adjust lever pivoted thereto, a zero-adjust screw carried by said arm and engaging said zero-adjust lever to adjust the same, a gauge movement on said main lever support and including a movable element, and means for operatively connecting said zero-adjust lever to said movable element comprising a pin carried by said zero-adjust lever, a link pivoted to said movable element and having a V notch, and spring means tending to engage the bottom of said V notch with said pin.

17. A weighing scale of the character disclosed comprising a U-shaped support mounted in an inverted position with one arm of the U considerably longer than the other, a yoke between said arms, the arms of said yoke carrying oppositely disposed knife edges, a fulcrum block having knife edge bearings to co-act with said knife edges, a supporting eye for said U-shaped support in alignment with said yoke, a supporting hook depending from said yoke, a deflection bar depending from the said fulcrum block, a link connection between the lower end of said deflection bar and said support comprising a flexible metal strap secured to the lower ends of said main lever support and said deflection bar, and means for sensing the deflection of said deflection bar in response to a weight imposed on said supporting hook.

18. A weighing scale of the character disclosed comprising a U-shaped support mounted in an inverted position with one arm of the U considerably longer than the other, a yoke between said arms, the arm and said yoke carrying oppositely disposed knife edges, a fulcrum block having knife edge bearings to co-act with said knife edges, a supporting eye for said U-shaped support in alignment with said yoke, a supporting hook depending from said yoke, a deflection bar depending from the said fulcrum block, a link connection between the lower end of said deflection bar and said support comprising a head adjustably secured to the lower end of said deflection bar, a flexible metal strap having one end secured thereto and the other end secured to said main lever support, and means for sensing the deflection of said deflection bar in response to a weight imposed on said supporting hook.

WILLIAM C. DILLON.

REFERENCES CITED

The following references are of record in the file of this patent:

UNITED STATES PATENTS

| Number | Name | Date |
|--------|------|------|
| 304,587 | Ward | Sept. 2, 1884 |
| 342,550 | Ward | May 25, 1886 |